(12) United States Patent  
Miyake et al.

(10) Patent No.: US 8,106,143 B2  
(45) Date of Patent: Jan. 31, 2012

(54) POLYCARBONATE RESIN COMPOSITION

(75) Inventors: Toshiyuki Miyake, Chiyoda-ku (JP);
Masami Kinoshita, Chiyoda-ku (JP);
Mizuho Saito, Chiyoda-ku (JP);
Katsuhiko Hironaka, Chiyoda-ku (JP)

(73) Assignee: Teijin Limited, Osaka (JP)

( * ) Notice: Subject to any disclaimer, the term of this patent is extended or adjusted under 35 U.S.C. 154(b) by 33 days.

(21) Appl. No.: 12/600,909

(22) PCT Filed: May 16, 2008

(86) PCT No.: PCT/JP2008/059490
§ 371 (c)(1),
(2), (4) Date: Nov. 19, 2009

(87) PCT Pub. No.: WO2008/146719
PCT Pub. Date: Dec. 4, 2008

(65) Prior Publication Data
US 2010/0160563 A1    Jun. 24, 2010

(30) Foreign Application Priority Data

May 23, 2007  (JP) ................................. 2007-136490

(51) Int. Cl.
*C08G 64/00* (2006.01)
*C08G 63/02* (2006.01)
(52) U.S. Cl. .......... 528/198; 521/173; 521/174; 528/73; 528/196
(58) Field of Classification Search .............. 521/173, 521/174; 528/73, 196, 198
See application file for complete search history.

(56) References Cited

U.S. PATENT DOCUMENTS
7,365,148 B2 *  4/2008  Ono et al. .................... 528/196
2006/0149024 A1  7/2006  Ono et al.

FOREIGN PATENT DOCUMENTS

| CA | 2662223 A1 | 3/2008 |
| GB | 1079686 A | 8/1967 |
| JP | 2007-070391 A | 3/2007 |
| JP | 2007-070438 A | 3/2007 |
| WO | 2004/111106 A1 | 12/2004 |
| WO | 2007/013463 A1 | 2/2007 |
| WO | 2008/026744 A1 | 3/2008 |

OTHER PUBLICATIONS

Okada, M., et al., "Biodegradable Polymers Based on Renewable Resources", Journal of Applied Polymer Science, 2002, pp. 872-880, vol. 86, Wiley Periodicals, Inc.
Kricheldorf, H.R., et al., "Polymers of Carbonic Acid", Macromolecules, 1996, pp. 8077-8082, vol. 29.

* cited by examiner

*Primary Examiner* — Terressa Boykin
(74) *Attorney, Agent, or Firm* — Sughrue Mion, PLLC

(57)  ABSTRACT

A resin composition includes a polycarbonate resin derived from an ether diol residue such as isosorbide and has excellent impact resistance, heat resistance, heat stability and moldability. The resin composition includes a rubber polymer (component B) in an amount of 1 to 30 parts by weight based on 100 parts by weight of a polycarbonate resin (component A) which contains a recurring unit represented by the following formula (1) as the main constituent and has a glass transition temperature (Tg) of 145 to 165° C. and a 5% weight loss temperature (Td) of 320 to 400° C.

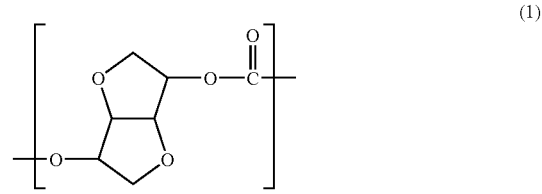

(1)

9 Claims, No Drawings

POLYCARBONATE RESIN COMPOSITION

TECHNICAL FIELD

The present invention relates to a resin composition which comprises a polycarbonate resin. More specifically, it relates to a resin composition which comprises a polycarbonate resin derived from sugar which is biogenic matter and is excellent in heat resistance, heat stability and impact resistance.

BACKGROUND OF THE ART

Polycarbonate resins are polymers obtained by combining aromatic or aliphatic dioxy compounds by means of a carbonate. Out of these, a polycarbonate resin obtained from 2,2-bis(4-hydroxyphenyl)propane (commonly called "bisphenol A") (may be referred to as "PC-A" hereinafter) is used in many fields because it has high transparency and heat resistance and excellent mechanical properties such as impact resistance.

Polycarbonate resins are generally manufactured from raw materials obtained from oil resources. The depletion of oil resources is now apprehended, and a polycarbonate resin obtained from an ether diol manufactured from sugar which is biogenic matter is under study. For example, an ether diol represented by the following formula (a) is easily made from sugar or starch and three stereoisomers of the ether diol are known.

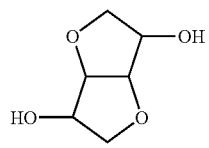
(a)

More specifically, they are 1,4:3,6-dianhydro-D-sorbitol (to be referred to as "isosorbide" hereinafter in this text) represented by the following formula (b), 1,4:3,6-dianhydro-D-mannitol (to be referred to as "isomannide" hereinafter in this text) represented by the following formula (c), and 1,4:3,6-dianhydro-L-iditol (to be referred to as "isoidide" hereinafter in this text) represented by the following formula (d).

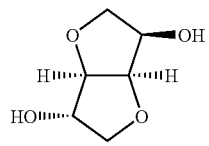
(b)

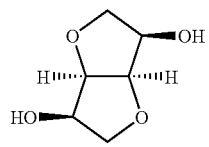
(c)

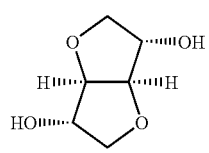
(d)

Isosorbide, isomannide and isoidide are obtained from D-glucose, D-mannose and L-idose, respectively. For example, isosorbide can be obtained by hydrogenating D-glucose and dehydrating it with an acid catalyst.

Particularly a polycarbonate resin obtained from isosorbide as a monomer out of the above ether diols has been studied.

For example, patent document 1 proposes a homopolycarbonate resin having a melting point of 203° C. which is manufactured by a melt transesterification process. Non-patent document 1 proposes a homopolycarbonate resin having a glass transition temperature of 166° C. and a thermal decomposition temperature (5% weight loss temperature) of about 283° C. which is manufactured by the melt transesterification process using zinc acetate as a catalyst. Non-patent document 2 proposes a homopolycarbonate resin having a glass transition temperature of about 144° C. which is manufactured from a bischloroformate of isosorbide by interfacial polymerization. Patent document 2 proposes a polycarbonate resin having a glass transition temperature of 170° C. or higher which is manufactured by using a tin catalyst. Patent document 3 proposes a copolycarbonate resin obtained from isosorbide and a linear aliphatic diol.

When the industrial application of these polycarbonate resins obtained from isosorbide is taken into consideration, the impact resistances of these resins must be improved. For example, the ISO179 notched Charpy impact strength of an isosorbide homopolycarbonate resin having a specific viscosity of 0.33 is about 6 kJ/m$^2$. This value is unsatisfactory for their industrial application and must be improved.

Since impact resistance greatly depends on the molecular weight (=specific viscosity) of a resin in general, to improve the impact resistance, the molecular weight of the resin must be increased. The isosorbide polycarbonate resins disclosed by the patent documents 1 and 2 and the non-patent documents 1 and 2 described above have a problem that when their molecular weights are increased, the melt viscosities of the resins become too high, thereby making it difficult to mold them.

Patent document 4 proposes a resin composition obtained by adding an addition polymer such as ABS resin to an isosorbide polycarbonate resin. Although impact resistance is improved by adding the ABS resin, heat resistance inherent in the polycarbonate resin greatly deteriorates.

(patent document 1) English Patent Application No. 1079686
(patent document 2) WO2007/013463
(patent document 3) WO2004/111106
(patent document 4) JP-A 2007-070438
(non-patent document 1) "Journal of Applied Polymer Science", 2002, vol. 86, p. 872-880
(non-patent document 2) "Macromolecules", 1996, vol. 29, p. 8077-8082

DISCLOSURE OF THE INVENTION

It is therefore an object of the present invention to provide a resin composition which comprises a polycarbonate resin derived from an ether diol such as isosorbide and has excellent impact resistance. It is another object of the present invention to provide a resin composition which has low melt viscosity and is excellent in heat resistance, heat stability and moldability.

The inventors of the present invention have found that, when an ether diol represented by the above formula (a) is melt polymerized in the presence of a specific catalyst, a polycarbonate resin which has high heat stability with a 5% weight loss temperature (Td) higher than 300° C. which was not attained in the prior art is obtained. They have also found that, when a rubber polymer is contained in this polycarbonate resin, the influence upon a reduction in heat stability of the added rubber polymer is small and the impact resistance can be improved. They have further found that the obtained resin composition has excellent heat resistance and low melt viscosity and is excellent in moldability. The present invention is based on these findings.

That is, the present invention is a resin composition comprising a rubber polymer (component B) in an amount of 1 to 30 parts by weight based on 100 parts by weight of a polycarbonate resin (component A) which contains a recurring unit represented by the following formula (1) and has a glass transition temperature (Tg) of 145 to 165° C. and a 5% weight loss temperature (Td) of 320 to 400° C.

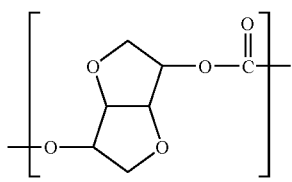

(1)

BEST MODE FOR CARRYING OUT THE INVENTION

The present invention will be described in detail hereinunder.

<Component A: Polycarbonate Resin>

The polycarbonate resin (component A) used in the present invention contains a recurring unit represented by the formula (1) and has a glass transition temperature (Tg) of 145 to 165° C. and a 5% weight loss temperature (Td) of 320 to 400° C.

The polycarbonate resin (component A) contains a recurring unit represented by the formula (1) as the main constituent. The content of the recurring unit represented by the formula (1) is preferably 70 mol % or more, more preferably 80 mol % or more, much more preferably 90 mol % or more, further more preferably 95 mol % or more, particularly preferably 98 mol % or more of the total of all the recurring units. Most preferably, the polycarbonate resin is a homopolycarbonate resin composed of only the recurring unit of the formula (1).

The recurring unit represented by the formula (1) is preferably a recurring unit derived from isosorbide (1,4:3,6-dianhydro-D-sorbitol).

The polycarbonate resin (component A) may contain another recurring unit besides the recurring unit represented by the formula (1). Example of the another recurring unit include recurring units derived from an aliphatic diol and an aromatic bisphenol.

Examples of the recurring unit derived from an aliphatic diol include recurring units derived from a linear alkanediol and a cycloalkanediol. The linear alkanediol is represented by the following formula (2).

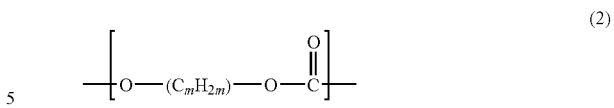

(2)

(in the formula, m is an integer of 1 to 10)

Examples of the linear alkanediol include ethylene glycol, 1,3-propanediol, 1,4-butanediol, 1,5-pentanediol and 1,6-hexanediol. Examples of the cycloalkanediol include cyclohexanediol and cyclohexanedimethanol. Out of these, 1,3-propanediol, 1,4-butanediol, hexanediol and cyclohexanedimethanol are preferred.

Examples of the recurring unit derived from an aromatic bisphenol include recurring units derived from 2,2-bis(4-hydroxyphenyl)propane (commonly called "bisphenol A"), 1,1-bis(4-hydroxyphenyl)cyclohexane, 1,1-bis(4-hydroxyphenyl)-3,3,5-trimethylcyclohexane, 4,4'-(m-phenylenediisopropylidene)diphenol, 9,9-bis(4-hydroxy-3-methylphenyl)fluorene, 2,2-bis(4-hydroxy-3-methylphenyl)propane, 2,2-bis(4-hydroxyphenyl)-4-methylpentane, 1,1-bis(4-hydroxyphenyl)decane and 1,3-bis{2-(4-hydroxyphenyl)propyl}benzene.

Other recurring units include recurring units derived from aromatic diols such as dimethanol benzene and diethanol benzene.

The content of the another recurring unit is preferably 30 mol % or less, more preferably 20 mol % or less, much more preferably 10 mol % or less, further more preferably 5 mol % or less, particularly preferably 2 mol % or less of the total of all the recurring units.

(Terminal Group)

The polycarbonate resin (component A) may contain a terminal group represented by the following formula (3) or (4).

(3)

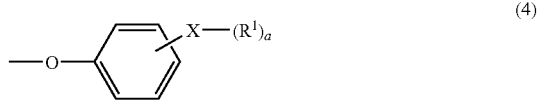

(4)

In the formulas (3) and (4), $R^1$ is an alkyl group having 4 to 30 carbon atoms, aralkyl group having 7 to 30 carbon atoms, perfluoroalkyl group having 4 to 30 carbon atoms or group represented by the following formula (5).

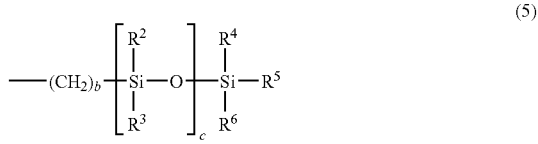

(5)

The number of carbon atoms of the alkyl group of $R^1$ is preferably 4 to 22, more preferably 8 to 22. Examples of the alkyl group include hexyl group, octyl group, nonyl group, decyl group, undecyl group, dodecyl group, pentadecyl group, hexadecyl group and octadecyl group.

The number of carbon atoms of the aralkyl group of $R^1$ is preferably 8 to 20, more preferably 10 to 20. Examples of the aralkyl group include benzyl group, phenethyl group, methylbenzyl group, 2-phenylpropane-2-yl group and diphenylmethyl group.

The number of carbon atoms of the perfluoroalkyl group of $R^1$ is preferably 2 to 20. Examples of the perfluoroalkyl group include 4,4,5,5,6,6,7,7,7-nonafluoroheptyl group, 4,4,5,5,6,6,7,7,8,8,9,9,9-tridecafluorononyl group and 4,4,5,5,6,6,7,7,8,8,9,9,10,10,11,11,11-heptadecafluoroun decyl group.

In the formula (5), $R^2$, $R^3$, $R^4$, $R^5$ and $R^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms.

Examples of the alkyl group having 1 to 10 carbon atoms in the formula (5) include methyl group, ethyl group, propyl group, butyl group and heptyl group. Examples of the cycloalkyl group having 6 to 20 carbon atoms include cyclohexyl group, cyclooctyl group, cyclohexyl group and cyclodecyl group. Examples of the alkenyl group having 2 to 10 carbon atoms include ethenyl group, propenyl group, butenyl group and heptenyl group. Examples of the aryl group having 6 to 10 carbon atoms include phenyl group, tolyl group, dimethylphenyl group and naphthyl group. Examples of the aralkyl group having 7 to 20 carbon atoms include benzyl group, phenethyl group, methylbenzyl group, 2-phenylpropane-2-yl group and diphenylmethyl group.

In the formula (5), preferably, $R^2$, $R^3$, $R^4$, $R^5$ and $R^6$ are each independently at least one group selected from the group consisting of an alkyl group having 1 to 10 carbon atoms and aryl group having 6 to 10 carbon atoms. Particularly preferably, $R^2$, $R^3$, $R^4$, $R^5$ and $R^6$ are each independently at least one group selected from the group consisting of methyl group and phenyl group.

b is an integer of preferably 0 to 3, more preferably 1 to 3, much more preferably 2 or 3. c is an integer of preferably 4 to 100, more preferably 4 to 50, much more preferably 8 to 50.

X in the formula (4) is at least one bond selected from the group consisting of a single bond, ether bond, thioether bond, ester bond, amino bond and amide bond. X is preferably at least one bond selected from the group consisting of a single bond, ether bond and ester bond. It is particularly preferably a single bond or an ester bond.

a is an integer of preferably 1 to 5, more preferably 1 to 3, much more preferably 1.

The terminal group represented by the above formula (3) or (4) is preferably derived from biogenic matter. Examples of the biogenic matter include long-chain alkyl alcohols having 14 or more carbon atoms, such as cetanol, stearyl alcohol and behenyl alcohol.

The content of the terminal group represented by the formula (3) or (4) is preferably 0.3 to 9 wt %, more preferably 0.3 to 7.5 wt %, much more preferably 0.5 to 6 wt % based on the main chain of the polymer.

When the terminal group represented by the formula (3) or (4) is contained at the terminal of the polycarbonate resin (component A), the moldability (releasability) and moisture absorption resistance of the resin composition are improved.

(Melt Viscosity)

The polycarbonate resin (component A) has a melt viscosity measured with a capillary rheometer at 250° C. of preferably $0.2 \times 10^3$ to $2.4 \times 10^3$ Pa·s, more preferably $0.4 \times 10^3$ to $2.0 \times 10^3$ Pa·s, much more preferably $0.4 \times 10^3$ to $1.8 \times 10^3$ Pa·s at a shear rate of 600 sec$^{-1}$. When the melt viscosity falls within this range, mechanical strength become high and a silver streak is not formed at the time of molding the resin composition of the present invention.

(Specific Viscosity)

The lower limit of specific viscosity of a solution prepared by dissolving 0.7 g of the polycarbonate resin (component A) in 100 ml of methylene chloride at 20° C. is preferably 0.14, more preferably 0.20, much more preferably 0.22. The upper limit of specific viscosity is preferably 0.45, more preferably 0.37, much more preferably 0.34. When the specific viscosity is lower than 0.14, it is difficult to provide sufficiently high mechanical strength to a molded article obtained from the resin composition of the present invention. When the specific viscosity is higher than 0.45, melt flowability becomes too high, whereby the melt temperature at which the polycarbonate resin has flowability required for molding becomes higher than its decomposition temperature disadvantageously.

(Glass Transition Temperature: Tg)

The lower limit of glass transition temperature (Tg) of the polycarbonate resin (component A) is 145° C., preferably 148° C. The upper limit of glass transition temperature is 165° C. Therefore, the glass transition temperature (Tg) of the polycarbonate resin (component A) is 145 to 165° C.

When Tg is lower than 145° C., heat resistance (especially heat resistance by moisture absorption) deteriorates and when Tg is higher than 165° C., melt flowability degrades at the time of molding the resin composition of the present invention. Tg is measured with the DSC (Model DSC2910) of TA Instruments Co., Ltd.

(5% Weight Loss Temperature: Td)

The lower limit of 5% weight loss temperature of the polycarbonate resin (component A) is 320° C., preferably 330° C. The upper limit of 5% weight loss temperature is 400° C., preferably 390° C., more preferably 380° C. Therefore, the 5% weight loss temperature (Td) of the polycarbonate resin (component A) is 320 to 400° C. When the 5% weight loss temperature falls within the above range, the decomposition of the resin rarely occurs at the time of molding the resin composition of the present invention. The 5% weight loss temperature (Td) is measured with the TGA (Model TGA2950) of TA Instruments Co., Ltd.

<Manufacture of Polycarbonate Resin (Component A)>

The polycarbonate resin (component A) can be manufactured by melt polymerizing a diol component which contains an ether diol represented by the following formula (a) as the main constituent and a diester carbonate.

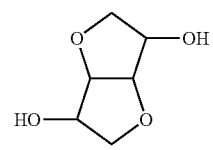

(a)

Examples of the ether diol include isosorbide, isomannide and isoidide represented by the following formulas (b), (c) and (d), respectively.

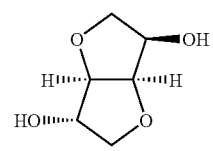

(b)

-continued

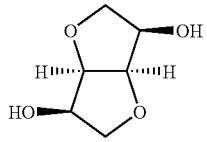

(c)

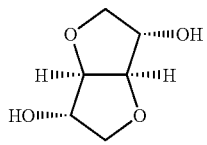

(d)

These ether diols derived from sugar are also obtained from biomass in the natural world and so-called "regenerable resources". Isosorbide is obtained by hydrogenating D-glucose obtained from starch and then dehydrating it. The other ether diols are obtained through a similar reaction except for starting materials.

Isosorbide (1,4:3,6-dianhydro-D-sorbitol) is particularly preferred as the ether diol. Isosorbide is an ether diol which can be easily made from starch, can be acquired abundantly as a resource and is superior to isommanide and isoidide in production ease, properties and application range.

The content of the ether diol represented by the formula (a) is preferably 70 mol % or more, more preferably 80 mol % or more, much more preferably 90 mol or more, further more preferably 95 mol or more, particularly preferably 98 mol % or more of the total of all the diol components. The diol is most preferably composed of only the ether diol of the formula (a).

The polycarbonate resin (component A) may be copolymerized with an aliphatic diol or aromatic bisphenol as long as its characteristic properties are not impaired. Examples of the aliphatic diol include linear alkanediols such as ethylene glycol, 1,3-propanediol, 1,4-butanediol, 1,5-pentanediol and 1,6-hexanediol, and cycloalkanediols such as cyclohexanediol and cyclohexanedimethanol. Out of these, 1,3-propanediol, 1,4-butanediol, hexanediol and cyclohexanedimethanol are preferred.

Examples of the aromatic bisphenol include 2,2-bis(4-hydroxyphenyl)propane (commonly called "bisphenol A"), 1,1-bis(4-hydroxyphenyl)cyclohexane, 1,1-bis(4-hydroxyphenyl)-3,3,5-trimethylcyclohexane, 4,4'-(m-phenylenediisopropylidene)diphenol, 9,9-bis(4-hydroxy-3-methylphenyl)fluorene, 2,2-bis(4-hydroxy-3-methylphenyl) propane, 2,2-bis(4-hydroxyphenyl)-4-methylpentane, 1,1-bis(4-hydroxyphenyl) decane and 1,3-bis{2-(4-hydroxyphenyl)propyl}benzene. Aromatic diols such as dimethanolbenzene and diethanolbenzene may also be used.

The content of the aliphatic diol or aromatic bisphenol is preferably 30 mol % or less, more preferably 20 mol % or less, much more preferably 10 mol % or less, further more preferably 5 mol % or less, particularly preferably 2 mol % or less of the total of all the diol components.

The terminal modified polycarbonate resin (component A) can be manufactured by reacting 0.3 to 15 wt % based on the main chain of a hydroxyl compound represented by the following formula (6) or (7) (component C). The content of the hydroxyl compound (component C) is preferably 0.3 to 7.5 wt %, more preferably 0.5 to 6 wt % of the total of all the diol components.

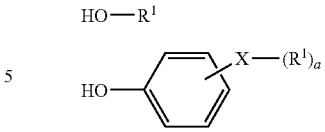

(6)

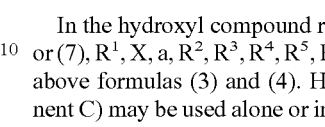

(7)

In the hydroxyl compound represented by the formula (6) or (7), $R^1$, X, a, $R^2$, $R^3$, $R^4$, $R^5$, $R^6$, b and c are as defined in the above formulas (3) and (4). Hydroxyl compounds (component C) may be used alone or in combination of two or more. When two or more hydroxyl compounds are used, the hydroxyl compound represented by the formula (6) or (7) (component C) and another hydroxyl compound may be used in combination. The heat resistance, heat stability, moldability and water absorption resistance of the polycarbonate resin are improved by the hydroxyl compound (component C).

Although it is preferred to use as low a reaction temperature as possible so as to suppress the decomposition of the ether diol and obtain a resin which is little colored and has high viscosity, the polymerization temperature is in the range of preferably 180 to 280° C., more preferably 180 to 270° C. in order to promote the polymerization reaction properly.

After the ether diol and the diester carbonate are heated at normal pressure to be pre-reacted with each other in the initial stage of the reaction, the pressure is gradually reduced until the pressure of the system becomes about $1.3 \times 10^{-3}$ to $1.3 \times 10^{-5}$ MPa in the latter stage of the reaction to facilitate the distillation-off of the formed alcohol or phenol. The reaction time is generally about 1 to 4 hours.

The polycarbonate resin (component A) having a specific glass transition temperature (Tg) and a specific 5% weight loss temperature (Td) used in the present invention can be manufactured by melt polymerization in the presence of (i) a nitrogen-containing basic compound and (ii) an alkali (earth) metal compound. The alkali (earth) metal compound (ii) is an (ii-1) an alkali metal compound, (ii-2) an alkali earth metal compound or a mixture thereof.

Examples of the nitrogen-containing basic compound (i) include tetramethylammonium hydroxide, tetraethylammonium hydroxide, tetrabutylammonium hydroxide, trimethylamine and triethylamine.

Examples of the alkali metal compound (ii-1) include sodium hydroxide, potassium hydroxide, sodium carbonate, potassium carbonate, sodium hydrogen carbonate, and sodium salts and potassium salts of a diphenol. Examples of the alkali earth metal compound (ii-2) include calcium hydroxide, barium hydroxide and magnesium hydroxide. A combination of (i) a nitrogen-containing basic compound and (ii-1) an alkali metal compound is preferably used.

The amount of the polymerization catalyst is preferably $1 \times 10^{-9}$ to $1 \times 10^{-3}$ equivalent, more preferably $1 \times 10^{-8}$ to $5 \times 10^{-4}$ equivalent based on 1 mol of the diester carbonate. The reaction system is preferably kept in an inert gas atmosphere such as nitrogen inactive to raw materials, a reaction mixture and a reaction product. Inert gases except nitrogen include argon. Further, additives such as an antioxidant may be added as required.

When a combination of (i) a nitrogen-containing basic compound and (ii) an alkali (earth) metal compound is used as a catalyst, a polycarbonate resin having a higher 5% weight loss temperature (Td) can be manufactured than when tin is used as a catalyst.

The diester carbonate is an ester such as an aryl group having 6 to 20 carbon atoms, aralkyl group or alkyl group having 1 to 18 carbon atoms, all of which may be substituted. Specific examples of the diester carbonate include diphenyl carbonate, bis(chlorophenyl)carbonate, m-cresyl carbonate, dinaphthyl carbonate, bis(p-butylphenyl)carbonate, dimethyl carbonate, diethyl carbonate and dibutyl carbonate. Out of these, diphenyl carbonate is particularly preferred.

The diester carbonate is mixed in a molar ratio of preferably 1.02 to 0.98, more preferably 1.01 to 0.98, much more preferably 1.01 to 0.99 based on the total of all the diol components. When the molar ratio of the diester carbonate is higher than 1.02, the ester carbonate residue serves as a terminal capping agent, whereby a sufficiently high degree of polymerization cannot be obtained disadvantageously. When the molar ratio of the diester carbonate is lower than 0.98, a sufficiently high degree of polymerization cannot be obtained as well disadvantageously.

A catalyst deactivator may be added to the polycarbonate resin (component A) obtained by the above manufacturing method. Known catalyst deactivators are effectively used as the catalyst deactivator. Out of these, ammonium salts and phosphonium salts of sulfonic acid are preferred, and the above salts of dodecylbenzenesulfonic acid such as tetrabutyl phosphonium salts of dodecylbenzenesulfonic acid and the above salts of paratoluenesulfonic acid such as tetrabutylammonium salts of paratoluenesulfonic acid are more preferred. Methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used as the ester of sulfonic acid. Out of these, tetrabutylphosphonium salts of dodecylbenzenesulfonic acid are most preferably used. The amount of the catalyst deactivator is preferably 0.5 to 50 mols, more preferably 0.5 to 10 mols, much more preferably 0.8 to 5 mols based on 1 mol of the polymerization catalyst selected from alkali metal compounds and/or alkali earth metal compounds.

(Component B: Rubber Polymer)

The rubber polymer (component B) used in the present invention is preferably a polymer comprising a rubber component and having a glass transition temperature of 10° C. or lower, preferably −10° C. or lower, more preferably −30° C. or lower or a copolymer obtained by bonding the polymer comprising a rubber component to another polymer chain. The rubber polymer (component B) contains preferably at least 35 wt %, more preferably 45 wt % of the rubber component based on 100 wt % of the rubber polymer. The upper limit of the content of the rubber component is suitably about 90 wt % for practical application.

Specific examples of the rubber polymer as the component B include SB (styrene-butadiene) copolymer, ABS (acrylonitrile-butadiene-styrene) copolymer, MBS (methyl methacrylate-butadiene-styrene) copolymer, MABS (methyl methacrylate-acrylonitrile-butadiene-styrene) copolymer, MB (methyl methacrylate-butadiene) copolymer, ASA (acrylonitrile-styrene-acrylic rubber) copolymer, AES (acrylonitrile-ethylene propylene rubber-styrene) copolymer, MA (methyl methacrylate-acrylic rubber) copolymer, MAS (methyl methacrylate-acrylic rubber-styrene) copolymer, methyl methacrylate.acryl-butadiene rubber copolymer, methyl methacrylate-acryl.butadiene rubber-styrene copolymer, methyl methacrylate-(acryl.silicone IPN rubber) copolymer and natural rubber.

At least one rubber polymer selected from the group consisting of SB copolymer, ABS copolymer, MBS copolymer, methyl methacrylate.acryl-butadiene rubber copolymer and methyl methacrylate-(acryl.silicone IPN rubber) copolymer and natural rubber out of these is preferred.

Methyl methacrylate.acryl-butadiene rubber copolymer and methyl methacrylate-(acryl.silicone IPN rubber) copolymer are particularly preferred. Examples of the methyl methacrylate.acryl-butadiene rubber copolymer include the "Paraloid EXL2602" of Rohm and Haas Company. Examples of the methyl methacrylate-(acryl.silicone IPN rubber) copolymer include the "Metabrene S-2001" of Mitsubishi Rayon Co., Ltd.

The content of the rubber polymer (component B) in the resin composition of the present invention is 1 to 30 parts by weight, preferably 1 to 20 parts by weight, more preferably 1 to 15 parts by weight, much more preferably 1 to 10 parts by weight, particularly preferably 1 to 7 parts by weight based on 100 parts by weight of the polycarbonate resin (component A). When the content of the rubber polymer (component B) is lower than 1 part by weight, the development of impact strength becomes unsatisfactory and when the content is higher than 30 parts by weight, heat resistance or stiffness deteriorates.

(Release Agent)

The resin composition of the present invention may contain a release agent. The release agent is an ester of an alcohol and a fatty acid. The ester is preferably an ester of a monohydric alcohol and a fatty acid, or a partial ester or whole ester of a polyhydric alcohol and a fatty acid. A partial ester and/or whole ester of a polyhydric alcohol and a fatty acid is more preferred, and a partial ester of a polyhydric alcohol and a fatty acid is much more preferred. The term "partial ester" means that some of the hydroxyl groups of the polyhydric alcohol remain without being ester reacted with the fatty acid. At least one release agent selected from (i) an ester of a monohydric alcohol having 1 to 20 carbon atoms and a saturated fatty acid having 10 to 30 carbon atoms and (ii) a partial ester or whole ester of a polyhydric alcohol having 1 to 25 carbon atoms and a saturated fatty acid having 10 to 30 carbon atoms is preferred. A partial ester or whole ester of a polyhydric alcohol having 1 to 25 carbon atoms and a saturated fatty acid having 10 to 30 carbon atoms is particularly preferred.

Examples of the ester of a monohydric alcohol and a saturated fatty acid include stearyl stearate, palmityl palmitate, butyl stearate, methyl laurate and isopropyl palmitate.

Examples of the partial ester or whole ester of a polyhydric alcohol and a saturated fatty acid include glycerin monostearate, glycerin distearate, glycerin tristearate, glycerin monobehenate, pentaerythritol monostearate, pentaerythritol distearate, pentaerythritol tetrastearate, pentaerythritol tetrapelargonate, propylene glycol monostearate, biphenyl biphenate, sorbitan monostearate, 2-ethylhexyl stearate and whole esters or partial esters of dipentaerythritol such as dipentaerythritol hexastearate.

Out of these esters, partial esters such as glycerin monostearate, glycerin distearate, glycerin monobehenate, pentaerythritol monostearate, pentaerythritol distearate, propylene glycol monostearate and sorbitan monostearate are preferred, glycerin monostearate, sorbitan monostearate, pentaerythritol monostearate and pentaerythritol distearate are more preferred, and glycerin monostearate is particularly preferred. These compounds as the component C may be used alone or in combination of two or more.

The content of the release agent is preferably 0.01 to 0.5 part by weight, more preferably 0.03 to 0.5 part by weight, much more preferably 0.03 to 0.3 part by weight, particularly preferably 0.03 to 0.2 part by weight based on 100 parts by weight of the polycarbonate resin (component A). When the content of the release agent falls within this range, releasability can be improved while yellowing is suppressed.
(Stabilizer)

The resin composition of the present invention may contain a hindered phenol-based heat stabilizer and/or a phosphorus-based heat stabilizer.

Examples of the hindered phenol-based heat stabilizer include octadecyl-3-(3,5-di-tert-butyl-4-hydroxyphenyl) propionate, 3,5-bis(1,1-dimethylethyl)-4-hydroxyalkyl benzenepropanoate (alkyl having 7 to 9 carbon atoms and a side chain), ethylenebis(oxyethylene)bis[3-(5-tert-butyl-4-hydroxy-m-tolyl)propionate], hexamethylenebis[3-(3,5-di-tert-butyl-4-hydroxyphenyl) propionate], pentaerythritol tetrakis[3-(3,5-di-tert-butyl-4-hydroxyphenyl)propionate], 3,9-bis[2-[3-(3-tert-butyl-4-hydroxy-5-methylphenyl) propionyloxy]-1,1-dimethylethyl]-2,4,8,10-tetraoxaspiro[5.5] undecane, 2,2'-methylenebis(6-tert-butyl-4-methylphenol), 2,2'-isopropylidenebis(6-tert-butyl-4-methylphenol), 2-tert-butyl-6-(3-tert-butyl-2-hydroxy-5-methylbenzyl)-4-methylphenyl acrylate, 2-tert-pentyl-6-(3-tert-pentyl-2-hydroxy-5-methylbenzyl)-4-methylphenyl acrylate, 2-tert-butyl-6-(3-tert-butyl-2-hydroxy-5-methylbenzyl)-4-methylphenyl methacrylate, 2-tert-pentyl-6-(3-tert-pentyl-2-hydroxy-5-methylbenzyl)-4-methylphenyl acrylate, 2-[1-(2-hydroxy-3,5-di-tert-butylphenyl)ethyl]-4,6-di-tert-butylphenyl acrylate, 2-[1-(2-hydroxy-3,5-di-tert-pentylphenyl) ethyl]-4,6-di-tert-pentylphenyl acrylate, 2-[1-(2-hydroxy-3,5-di-tert-butylphenyl)ethyl]-4,6-di-tert-butylphenyl methacrylate and 2-[1-(2-hydroxy-3,5-di-tert-pentylphenyl)ethyl]-4,6-di-tert-pentylphenyl methacrylate. The hindered phenol-based stabilizers may be used alone or in combination of two or more.

The content of the hindered phenol-based stabilizer is preferably 0.0005 to 0.1 part by weight, more preferably 0.001 to 0.1 part by weight, much more preferably 0.005 to 0.1 part by weight, particularly preferably 0.01 to 0.1 part by weight based on 100 parts by weight of the polycarbonate resin (component A). When the content of the hindered phenol-based heat stabilizer falls within this range, a reduction in the molecular weight and the worsening of the color of the resin composition of the present invention can be suppressed at the time of molding.

The phosphorus-based heat stabilizer is, for example, a phosphorous acid, phosphoric acid, phosphonous acid, phosphonic acid or ester thereof. Specific examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutylbiphenyl phosphite, monodecyldiphenyl phosphite, monooctyldiphenyl phosphite, 2,2-methylenebis(4,6-di-tert-butylphenyl) octyl phosphite, tris(diethylphenyl) phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl) pentaerythritol diphosphite, phenyl bisphenol A pentaerythritol diphosphite, bis(nonylphenyl)pentaerythritol diphosphite and dicyclohexylpentaerythritol diphosphite.

Another phosphite compound which reacts with a diphenol and has a cyclic structure may also be used. Examples of the phosphite compound include 2,2'-methylenebis(4,6-di-tert-butylphenyl) (2,4-di-tert-butylphenyl)phosphite, 2,2'-methylenebis(4,6-di-tert-butylphenyl) (2-tert-butyl-4-methylphenyl)phosphite, 2,2'-methylenebis(4-methyl-6-tert-butylphenyl) (2-tert-butyl-4-methylphenyl)phosphite and 2,2'-ethylidenebis(4-methyl-6-tert-butylphenyl) (2-tert-butyl-4-methylphenyl)phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Triphenyl phosphate and trimethyl phosphate are preferred.

Examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonite and bis(2,4-di-tert-butylphenyl)-phenyl-phenyl phosphonite are more preferred. The phosphonite compound is preferably used in combination with a phosphite compound having an aryl group substituting two or more alkyl groups. Examples of the phosphonate compound include dimethyl benzenephosphonate, diethyl benzenephosphonate and dipropyl benzenephosphonate. The above phosphorus-based stabilizers may be used alone or in combination of two or more.

The content of the phosphorus-based stabilizer is preferably 0.001 to 0.5 part by weight, more preferably 0.005 to 0.5 part by weight, much more preferably 0.005 to 0.3 part by weight, particularly preferably 0.01 to 0.3 part by weight based on 100 parts by weight of the polycarbonate resin (component A). When the content of the phosphorus-based stabilizer falls within this range, a reduction in the molecular weight or the worsening of the color of the resin composition of the present invention can be suppressed at the time of molding.
(Melt Viscosity)

The resin composition of the present invention has a melt viscosity measured with a capillary rheometer at 250° C. of preferably $0.2 \times 10^3$ to $2.4 \times 10^3$ Pa·s, more preferably $0.4 \times 10^3$ to $2.0 \times 10^3$ Pa·s, much more preferably $0.4 \times 10^3$ to $1.8 \times 10^3$ Pa·s at a shear rate of 600 $\sec^{-1}$. When the melt viscosity falls within this range, an excellent molded article having high mechanical strength without a silver streak at the time of melt molding is obtained.
(Impact Strength)

The resin composition of the present invention has a notched Charpy impact strength measured in accordance with ISO179 of preferably 10 to 100 $kJ/m^2$, more preferably 10 to 50 $kJ/m^2$, much more preferably 10 to 40 $kJ/m^2$.
(Flexural Modulus)

The resin composition of the present invention has a flexural modulus measured in accordance with ISO178 of preferably 2,500 to 4,000 MPa, more preferably 2,750 to 4,000 MPa, much more preferably 3,000 to 4,000 MPa. A molded article having good balance between impact strength and flexural modulus can be obtained from the resin composition of the present invention as described above.

(Deflection Temperature Under Load)

The resin composition of the present invention has a deflection temperature under a load of 0.45 MPa measured in accordance with ISO75 of preferably 100 to 160° C., more preferably 110 to 150° C., much more preferably 120 to 150° C. When the deflection temperature under load falls within the above range, heat resistance and melt flowability are well balanced advantageously.

<Manufacture of Resin Composition>

The resin composition of the present invention can be manufactured, for example, by pre-mixing the above components and optional components, melt kneading the pre-mixture and pelletizing the obtained kneaded product. Examples of the premixing means include a Nauter mixer, twin-cylinder mixer, Henschel mixer, mechanochemical device and extrusion mixer. During pre-mixing, granulation may be optionally carried out by means of an extrusion granulator or a briquetting machine. After pre-mixing, the pre-mixture is melt kneaded by means of a melt kneader typified by a vented double-screw extruder and pelletized by means of a device such as a pelletizer. Other examples of the melt kneader include a Banbury mixer, kneading roll and isothermic stirrer. Out of these, a vented double-screw extruder is preferred. Alternatively, all the above components may be supplied into the melt kneader typified by a double-screw extruder independently without being pre-mixed together. The cylinder temperature for melt kneading is preferably 220 to 270° C., more preferably 230 to 260° C., much more preferably 230 to 250° C. When the cylinder temperature is higher than 270° C., the thermal decomposition of the polycarbonate resin greatly proceeds.

The resin composition of the present invention is preferably manufactured by melt kneading together the above components by means of an extruder. A double-screw extruder is particularly preferred as the extruder, and an extruder having a vent from which water contained in the raw material and a volatile gas generated from the molten kneaded resin can be removed may be preferably used. A vacuum pump is preferably installed to discharge the generated water and volatile gas to the outside of the extruder from the vent efficiently.

A screen for removing foreign matter contained in the extruded raw material may be installed in a zone before the dice of the extruder to remove the foreign matter from the resin composition. Examples of the screen include a metal net, screen changer and sintered metal plate (such as a disk filter).

The method of supplying the component B and other additives (to be simply referred to as "additives" in the following examples) into the extruder is not particularly limited. The following methods are typical examples of the method:

(i) one in which the additives are supplied into the extruder separately from the component A resin
(ii) one in which the additives and the component A resin powder are pre-mixed together by means of a mixer such as a super mixer and then supplied into the extruder
(iii) one in which the additives and the component A resin are melt kneaded together in advance to prepare a master pellet
(iv) one in which the resin and the additives are uniformly dispersed into a solvent to prepare a solution and the solvent is removed as another pre-mixing method.

The resin composition extruded from the extruder is pelletized by directly cutting it or by forming it into a strand and cutting the strand with a pelletizer. When the influence of external dust must be reduced, the atmosphere surrounding the extruder is preferably cleaned. In the manufacture of the above pellet, it is preferred to narrow the form distribution of pellets and to reduce the number of miscut products, the amount of fine powders generated at the time of conveyance or transportation and the number of cells (vacuum cells) formed in the strand or pellet by employing various methods which have already been proposed for polycarbonate resins for optical disks and cyclic polyolefin resins for optical use. Thereby, the molding cycle can be increased and the incidence of a defect such as a silver streak can be reduced.

The shape of the pellet may be columnar, rectangular column-like or spherical, preferably columnar. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

(Additives and Others)

Various additives (functionalizing agents) may be added to the resin composition of the present invention according to application purpose. The additives include a plasticizer, optical stabilizer, heavy metal inactivating agent, flame retardant, lubricant, antistatic agent and ultraviolet absorber. Further, the resin composition of the present invention may be combined with an organic or inorganic filler or fiber to be used as a complex according to application purpose. Examples of the filler include carbon, talc, mica, wollastonite, montmorillonite and hydrotalcite. Examples of the fiber include natural fibers such as kenaf, synthetic fibers, glass fibers, quartz fibers and carbon fibers.

The resin composition of the present invention may be mixed with an aliphatic polyester, aromatic polyester, aromatic polycarbonate, polyamide, polystyrene, polyolefin, polyacryl, ABS, polyurethane or polylactic acid to be alloyed.

(Molded Article)

The present invention includes a molded article formed out of the above resin composition. The molded article can be manufactured by injection molding or extrusion molding.

Injection molding is preferably carried out at a cylinder temperature of 220 to 270° C. To suppress coloration and a reduction in molecular weight caused by the decomposition of the polymer, the cylinder temperature is in the range of preferably 230 to 260° C., more preferably 230 to 250° C. When the cylinder temperature is higher than 270° C., the decomposition of the polymer is greatly promoted. Although the mold temperature may be in the range of 40 to 140° C., it is preferably 40 to 120° C., more preferably 40 to 100° C. in order to shorten the molding cycle and the melt residence time of the resin.

Injection molding may use not only the ordinary cold-runner system but also the hot-runner system. For injection molding, not only ordinary molding techniques but also injection molding techniques such as injection compression molding, injection press molding, gas assist injection molding, foam molding (including what comprises the injection of a super-critical fluid), insert molding, in-mold coating molding, insulated runner molding, quick heating and cooling molding, two-color molding, sandwich molding and super high-speed injection molding may be suitably employed according to purpose. The advantages of these molding techniques are already widely known.

The resin composition of the present invention can be extrusion molded to obtain an atypical extrusion molded article, sheet or film. For the molding of a sheet or a film, inflation, calendering or casting may be used. Further, the resin composition may be molded into a heat shrinkable tube by carrying out specific stretching operation. The resin composition of the present invention can be formed into a molded article by rotational molding or blow molding.

EXAMPLES

The following examples are provided for the purpose of further illustrating the present invention but are in no way to be taken as limiting. "Parts" in the examples means parts by weight and "%" means wt %. The examples were evaluated by the following methods.

(1) Specific Viscosity ($\eta_{sp}$)

A pellet was dissolved in methylene chloride to a concentration of about 0.7 g/dL to measure the specific viscosity of the resulting solution at 20° C. with an Ostwald's viscosimeter (RIGO AUTO VISCOSIMETER TYPE VMR-0525•PC). The specific viscosity ($\eta_{sp}$) was obtained from the following equation.

$$\eta_{sp} = t/t_0 - 1$$

t: flow time of a specimen solution
$t_0$: flow time of a solvent alone (2) Glass Transition Temperature (Tg)

This was measured with the DSC (Model DSC2910) of TA Instruments Co., Ltd. by using the pellet.

(3) 5% Weight Loss Temperature (Td)

This was measured with the TGA (Model TGA2950) of TA Instruments Co., Ltd. by using the pellet.

(4) Melt Viscosity

The melt viscosity at 600 sec$^{-1}$ was read from a Shear Rate/Viscosity curve obtained by measuring with the capillary rheometer (Capillograph Model 1D) of Toyo Seiki Seisaku-sho, Ltd. at a capillary length of 10.0 mm, a capillary diameter of 1.0 mm and a measurement temperature of 250° C. by changing the measurement speed arbitrarily.

(5) Notched Charpy Impact Strength

After the pellet was dried at 120° C. for 12 hours, a bending test sample was molded out of the pellet with the JSWJ-75EIII of The Japan Steel Works, Ltd. at a cylinder temperature of 250° C. and a mold temperature of 90° C. A notched Charpy impact test was made on this test sample in accordance with ISO179.

(6) Flexural Modulus

A bending test was made on the bending test sample manufactured in (5) in accordance with ISO178.

(7) Deflection Temperature Under Load (0.45 MPa)

The deflection temperature under low load (0.45 MPa) of the bending test sample manufactured in (5) was measured in accordance with ISO75.

(8) Content of Terminal Modifying Group $^1$H-NMR of the pellet in a heavy chloroform solution was measured with the JNM-AL400 of JEOL Ltd. to obtain the content of a terminal modifying group from the integral ratio of a specific proton derived from the ether diol to a specific proton derived from the terminal hydroxy compound. The content of the terminal modifying group was obtained from the following equation.

$$\text{Content of terminal modifying group} = [Rt] \times \frac{[Mt] \times [Re]}{[Me]} \times 100 (\text{wt \%})$$

Rt: proportion of terminal hydroxyl compound to ether diol obtained from the integral ratio of $^1$H-NMR
Mt: molecular weight of constituent unit of terminal hydroxyl compound
Re: composition ratio of ether diol to main chain obtained from the integral ratio of $^1$H-NMR
Me: molecular weight of constituent unit of ether diol (9) Moldability The shape of a molded plate having a thickness of 2 mm molded by using the JSWJ-75EIII of The Japan Steel Works, Ltd. was evaluated with the eyes (mold temperature: 80 to 110° C., cylinder temperature: 230 to 260° C.). The criteria are as follows.

○; no silver streak formed by turbidity, cracking, surface sink or decomposition is seen
X; a silver streak formed by turbidity, cracking, surface sink or decomposition is seen Reference Example 1

Manufacture of Polycarbonate Resin 7,307 parts by weight (50 mols) of isosorbide and 10,709 parts by weight (50 mols) of diphenyl carbonate were fed to a reactor, and 4.8 parts by weight ($1 \times 10^{-4}$ mol based on 1 mol of the diphenyl carbonate component) of tetramethylammonium hydroxide and $5.0 \times 10^{-3}$ part by weight ($0.25 \times 10^{-6}$ mol based on 1 mol of the diphenyl carbonate component) of sodium hydroxide as polymerization catalysts were fed to the reactor and dissolved by heating at 180° C. and normal pressure in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carryout the reaction for 20 minutes while the phenol was distilled off, and the temperature was further raised to 220° C. to carry out the reaction for 30 minutes and then to 250° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-6}$ MPa, the temperature was gradually increased to 260° C., and the reaction was carried out at 260° C. and $6.66 \times 10^{-5}$ MPa for 1 hour in the end. The polymer after the reaction was pelletized to obtain a pellet having a specific viscosity of 0.33. This pellet had a glass transition temperature of 165° C. and a 5% weight loss temperature of 355° C.

Reference Example 2

Manufacture of Polycarbonate Resin

A pellet having a specific viscosity of 0.23 was obtained in the same manner as in Reference Example 1 except that a reaction was carried out at 255° C. and $6.66 \times 10^{-5}$ MPa for 30 minutes in the end. This pellet had a glass transition temperature of 158° C. and a 5% weight loss temperature of 353° C.

Reference Example 3

Manufacture of Polycarbonate Resin 7,307 parts by weight (50 mols) of isosorbide, 10,923 parts by weight (51 mols) of diphenyl carbonate and 270 parts by weight (1.0 mol) of stearyl alcohol were fed to a reactor, and 4.7 parts by weight ($1 \times 10^{-4}$ mol based on 1 mol of the diphenyl carbonate component) of tetramethylammonium hydroxide and $4.0 \times 10^{-3}$ part by weight ($0.20 \times 10^{-6}$ mol based on 1 mol of the diphenyl carbonate component) of sodium hydroxide as polymerization catalysts were fed to the reactor and dissolved by heating at 180° C. and normal pressure in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out the reaction for 20 minutes while the phenol was distilled off, and the temperature was further raised to 220° C. to carry out the reaction for 30 minutes and then to 250° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased to 260° C., and the reaction was carried out at 260° C. and $6.66 \times 10^{-5}$ MPa for 1 hour in the end. The polymer after the reaction was pelletized to obtain a pellet having a specific viscosity of 0.31. This pellet had a terminal modifying group content of 1.7 wt %, a glass transition temperature of 150° C. and a 5% weight loss temperature of 362° C.

Reference Example 4

Manufacture of Polycarbonate Resin 7,234 parts by weight (49.5 mols) of isosorbide, 163 parts by weight (0.5 mol) of 1,1-bis(4-hydroxyphenyl) decane and 11,030 parts by weight (51.5 mols) of diphenyl carbonate were fed to a reactor, and 9.4 parts by weight ($2 \times 10^{-4}$ mol based on 1 mol of the diphenyl carbonate component) of tetramethylammonium hydroxide and $5.2 \times 10^{-2}$ part by weight ($2.5 \times 10^{-6}$ mol based on 1 mol of the diphenyl carbonate component) of sodium hydroxide as polymerization catalysts were fed to the reactor and dissolved by heating at 180° C. and normal pressure in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out a reaction for 20 minutes while the phenol was distilled off, and the temperature was further raised to 220° C. to carry out the reaction for 30 minutes and then to 250° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased to 260° C., and the reaction was carried out at 260° C. and $6.66 \times 10^{-5}$ MPa for 1 hour in the end. The polymer after the reaction was pelletized to obtain a pellet having a specific viscosity of 0.38. This pellet had a glass transition temperature of 158° C. and a 5% weight loss temperature of 356° C.

Reference Example 5

Manufacture of Copolycarbonate Resin

A pellet having a specific viscosity of 0.28 was obtained in the same manner as in Reference Example 1 except that 6,722 parts by weight (46 mols) of isosorbide, 10,709 parts by weight (50 mols) of diphenyl carbonate and 304 parts by weight (4 mols) of 1,3-propanediol were used. This pellet had a glass transition temperature of 146° C. and a 5% weight loss temperature of 342° C.

Examples 1 to 8 and Comparative Examples 1 to 2

Resin compositions in Table 1 were prepared as follows. Components in a ratio shown in Table 1 were weighed and uniformly mixed together, and the resulting mixtures were each injected into an extruder to prepare the resin compositions. A vented double-screw extruder having a diameter of 15 mm (KZW15-25MG of Technovel Corporation) was used as the extruder. The extrusion conditions include a delivery rate of 14 kg/h, a screw revolution of 250 rpm, a vent vacuum degree of 3 kPa and an extrusion temperature from a first feed port to a dice of 250° C. After the obtained pellets were dried at 100° C. for 12 hours, their physical properties were evaluated.

The used raw materials shown in Table 1 are as follows.
(Component A)
A-1: polycarbonate resin pellet manufactured in Reference Example 1
A-2: polycarbonate resin pellet manufactured in Reference Example 2
A-3: polycarbonate resin pellet manufactured in Reference Example 3
A-4: polycarbonate resin pellet manufactured in Reference Example 4
A-5: polycarbonate resin pellet manufactured in Reference Example 5
(Component B)
B-1: rubber polymer consisting of a polybutadiene core and a shell composed of methyl methacrylate and alkyl acrylate (Paraloid EXL2602 of Rohm and Haas Company)
B-2: rubber polymer consisting of a core composed of a composite rubber of silicone and acryl and an acrylic shell (Metabrene S-2001 of Mitsubishi Rayon Co., Ltd.)
(Release Agent)
L-1: glycerin monostearate (Rikemal S-100A of Riken Vitamin Co., Ltd.)
(Stabilizer)
S-1: bis(2,6-di-tert-butyl-4-methylphenyl)pentaerythritol diphosphite (Adecastab PEP-36 of Adeca Corporation)

TABLE 1

|  |  |  | Example 1 | Example 2 | Example 3 | Example 4 | Example 5 |
|---|---|---|---|---|---|---|---|
| Component A | A-1 | pbw | 100 | 100 | 100 | 100 |  |
|  | A-2 | pbw |  |  |  |  | 100 |
|  | A-3 | pbw |  |  |  |  |  |
|  | A-4 | pbw |  |  |  |  |  |
|  | A-5 | pbw |  |  |  |  |  |
| Component B | B-1 | pbw | 3 | 5 | 10 |  | 5 |
|  | B-2 | pbw |  |  |  | 5 |  |
| Others | L-1 | pbw | 0.1 | 0.05 | 0.3 | 0.05 | 0.1 |
|  | S-1 | pbw |  | 0.1 |  | 0.1 |  |
| 5% weight loss temperature | | ° C. | 352 | 353 | 353 | 343 | 350 |
| Melt viscosity | | $\times 10^3$ Pa·s | 1.3 | 1.4 | 1.5 | 1.7 | 0.6 |
| Moldability | | — | ○ | ○ | ○ | ○ | ○ |

TABLE 1-continued

| | | | | | | |
|---|---|---|---|---|---|---|
| Notched Charpy impact strength | kJ/m² | 14 | 22 | 36 | 23 | 11 |
| Flexural modulus | MPa | 3580 | 3330 | 2940 | 3270 | 3300 |
| Deflection temperature under load (0.45 MPa) | °C. | 150 | 146 | 131 | 149 | 143 |

| | | | Example 6 | Example 7 | Example 8 | Comparative Example 1 | Comparative Example 2 |
|---|---|---|---|---|---|---|---|
| Component A | A-1 | pbw | | | | 100 | |
| | A-2 | pbw | | | | | 100 |
| | A-3 | pbw | 100 | | | | |
| | A-4 | pbw | | 100 | | | |
| | A-5 | pbw | | | 100 | | |
| Component B | B-1 | pbw | 5 | 3 | 5 | | |
| | B-2 | pbw | | | | | |
| Others | L-1 | pbw | 0.05 | 0.05 | 0.1 | 0.05 | 0.05 |
| | S-1 | pbw | | | | | |
| 5% weight loss temperature | | °C. | 358 | 351 | 339 | 355 | 353 |
| Melt viscosity | | ×10³ Pa·s | 0.9 | 0.7 | 0.4 | 1.3 | 0.5 |
| Moldability | | — | ○ | ○ | ○ | ○ | ○ |
| Notched Charpy impact strength | | kJ/m² | 19 | 40 | 10 | 6 | Not measurable |
| Flexural modulus | | MPa | 3100 | 2880 | 3420 | 3640 | 3860 |
| Deflection temperature under load (0.45 MPa) | | °C. | 128 | 136 | 125 | 151 | 144 |

EFFECT OF THE INVENTION

The resin composition of the present invention has excellent impact resistance. The resin composition of the present invention has excellent heat resistance and heat stability. The resin composition of the present invention has excellent moldability due to its low melt viscosity. Since the resin composition of the present invention contains a polycarbonate resin derived from sugar, it has a high content of biogenic matter.

INDUSTRIAL APPLICABILITY

Since a molded article obtained from the resin composition of the present invention is excellent in color and mechanical properties such as impact resistance and stiffness, it can be used in a wide variety of fields such as optical parts, mechanical parts, construction materials, auto parts, electric and electronic parts, external parts for various equipment, resin trays and dinnerware.

The invention claimed is:

1. A resin composition comprising
   (i) 1 to 30 parts by weight of at least one rubber polymer (component B) selected from the group consisting of methyl methacrylate-acryl-butadiene rubber copolymer and methyl methacrylate-(acryl-silicone IPN rubber) copolymer, and
   (ii) 100 parts by weight of a polycarbonate resin (component A) which contains a recurring unit represented by the following formula (1) as the main constituent and has a 5% weight loss temperature (Td) of 320 to 400° C. and a deflection temperature under a load of 0.45 MPa measured in accordance with ISO75 of 100 to 160° C.:

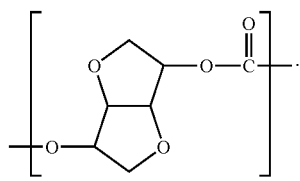

(1)

2. The resin composition according to claim 1, wherein the recurring unit represented by the formula (1) is a recurring unit derived from isosorbide (1,4:3,6-dianhydro-D-sorbitol).

3. The resin composition according to claim 1, wherein the polycarbonate resin (component A) contains the recurring unit represented by the formula (1) in an amount of 95 to 100 mol % based on the main chain.

4. The resin composition according to claim 1, wherein the polycarbonate resin (component A) is a resin which is melt polymerized in the presence of (i) a nitrogen-containing basic compound and (ii) an alkali (earth) metal compound.

5. The resin composition according to claim 1, wherein the polycarbonate resin (component A) contains a terminal group represented by the following formula (3) or (4) in an amount of 0.3 to 9 wt % based on the main chain:

(3)

(4)

(in the formulas (3) and (4), R¹ is an alkyl group having 4 to 30 carbon atoms, aralkyl group having 7 to 30 carbon atoms, perfluoroalkyl group having 4 to 30 carbon atoms or group represented by the following formula (5):

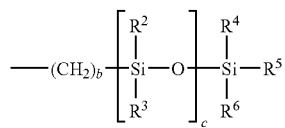 (5)

(in the formula (5), $R^2$, $R^3$, $R^4$, $R^5$ and $R^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, b is an integer of 0 to 3, and c is an integer of 4 to 100), X is at least one bond selected from the group consisting of a single bond, ether bond, thioether bond, ester bond, amino bond and amide bond, and a is an integer of 1 to 5).

6. The resin composition according to claim 1 which has a melt viscosity measured with a capillary rheometer at 250° C. of $0.2 \times 10^3$ to $2.4 \times 10^3$ Pa·s at a shear rate of 600 $\sec^{-1}$.

7. The resin composition according to claim 1 which has a notched Charpy impact strength measured in accordance with ISO179 of 10 to 100 kJ/m$^2$.

8. The resin composition according to claim 1 which has a notched Charpy impact strength measured in accordance with ISO179 of 10 to 50 kJ/m$^2$.

9. A molded article formed out of the resin composition of claim 1.

* * * * *